United States Patent Office 3,261,215
Patented July 19, 1966

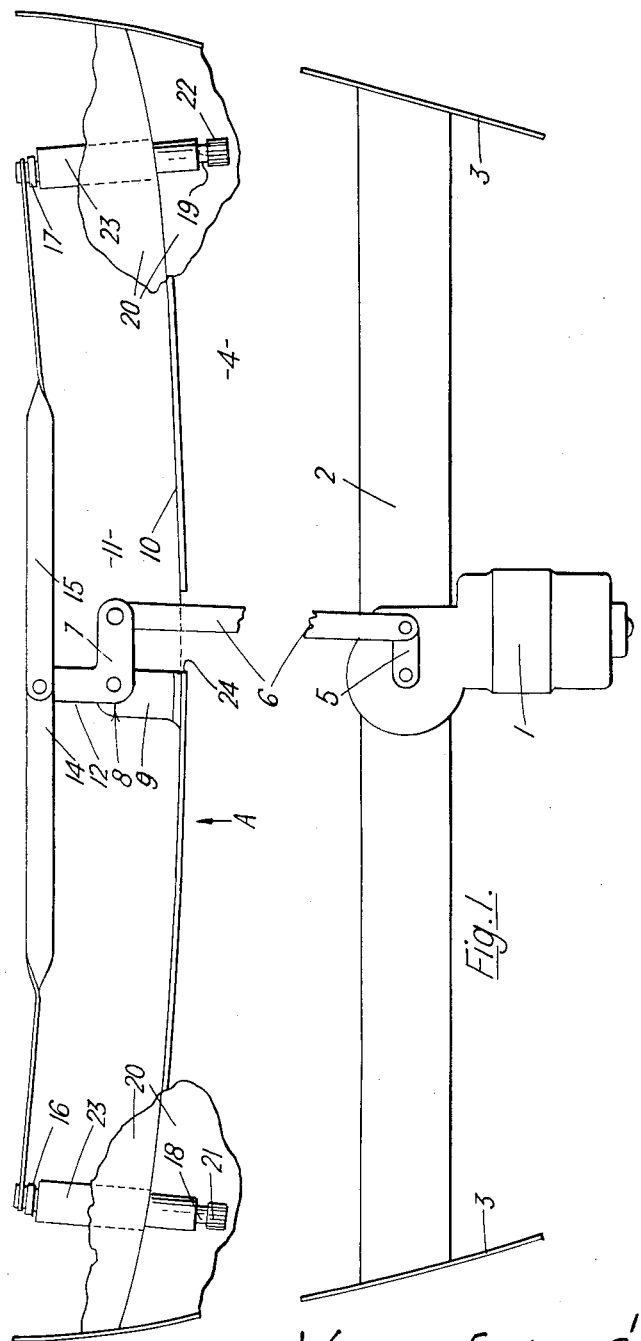

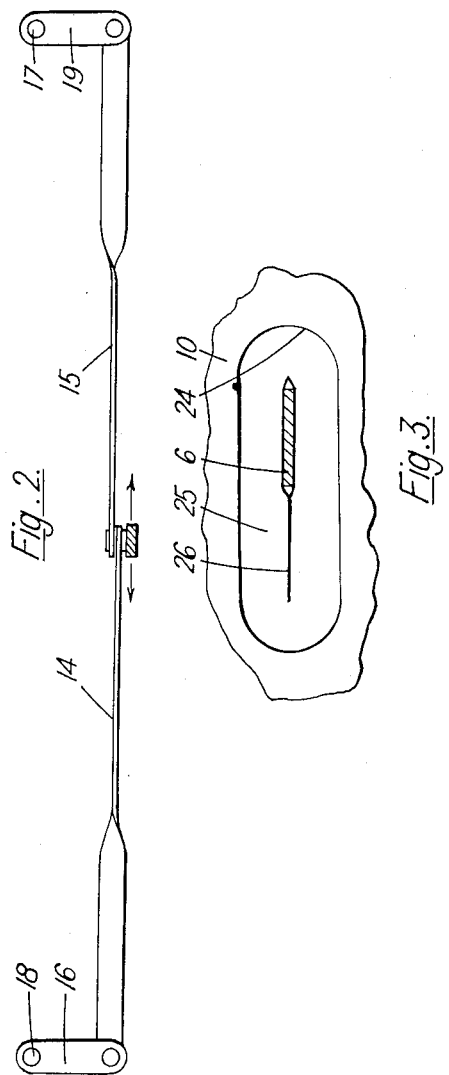

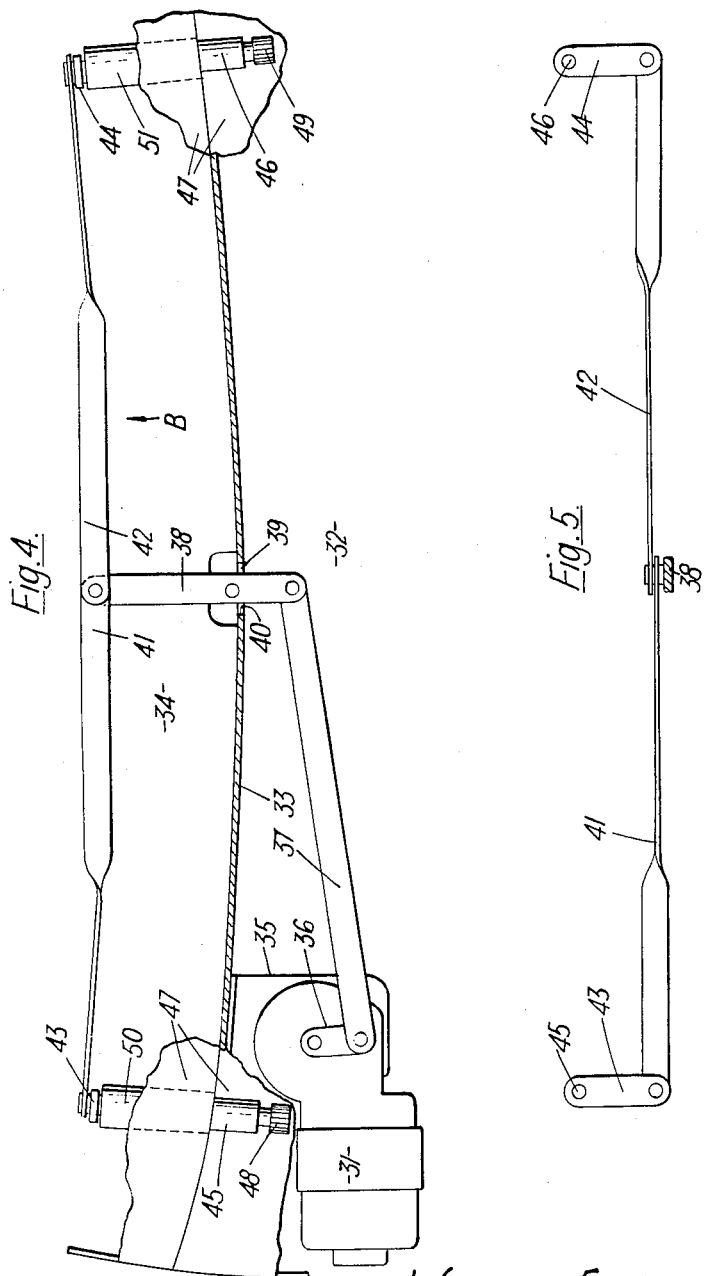

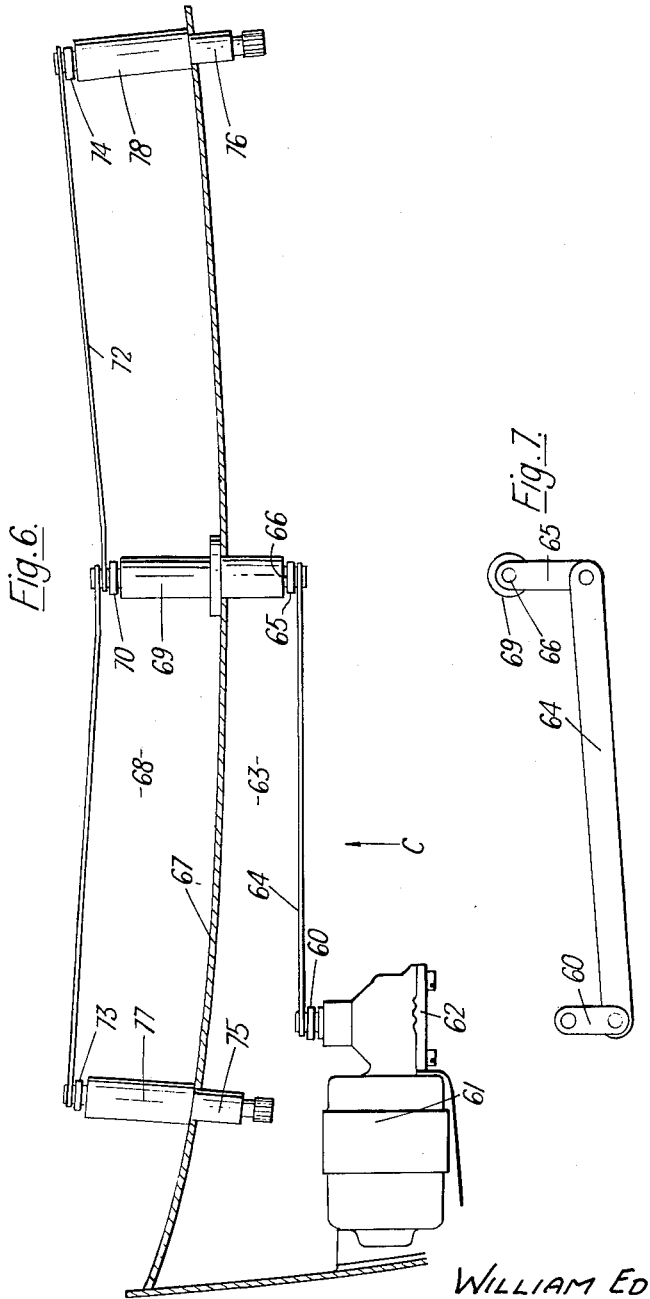

3,261,215
DRIVE MECHANISMS FOR MOTOR ROAD VEHICLE WINDSCREEN WIPER SYSTEMS
William Edward Simpson, Oakley, England, assignor to General Motors Corporation, Detroit, Mich., a corporation of Delaware
Filed Dec. 9, 1963, Ser. No. 329,161
Claims priority, application Great Britain, Dec. 12, 1962, 46,911/62; Jan. 29, 1963, 3,617/63
2 Claims. (Cl. 74—42)

This invention relates to drive mechanisms for motor road vehicle windscreen wiper systems.

In present day motor road vehicle windscreen wiper system the arm (or each of a pair of arms) which carries the wiper blade assembly is commonly mounted on the outer end of a pivot shaft which extends through the vehicle scuttle and whose inner end lies in a space between the instrument dashboard and the bulkhead or partition which separates the front compartment of the vehicle (which may be the engine compartment or, in the case of a rear drive vehicle, the luggage compartment) from the passenger compartment.

The inner end of the pivot shaft commonly carries an oscillatory crank arm which is linked for drive by the rotary drive crank of a windscreen wiper motor, which may be an electric motor. In such arrangements the wiper motor is mounted on or close to the partition between the front and passenger compartments of the vehicle, and as a result, the noise made by the motor when in operation is in many cases audible in the passenger compartment.

In a windscreen wiper drive mechanism according to the invention the windscreen wiper drive motor and the driven crank on the end of the wiper arm pivot shaft are respectively mounted forwardly and rearwardly of the partition which separates the front and passenger compartments of the vehicle, and the drive from the motor drive crank to the driven crank on the pivot shaft is transmitted by means of a pivoted lever mounted adjacent to and extending through said partition, the parts of the lever extending forwardly and rearwardly of said partition being respectively linked to the motor drive crank and the driven crank.

The lever may be pivotally mounted in the wall of the partition, or forwardly or rearwardly thereof; and the opening in the partition through which the lever extends is preferably provided with a grommet of rubber or like material to reduce the transmission of noise through the opening.

The lever may be a straight lever of the first, second or third order; or it may be a bell crank lever.

By means of the arrangement according to the invention the windscreen wiper motor may be mounted in a position remote from the passenger compartment of the vehicle and the amount of noise from the windscreen wiper motor which is audible in the passenger compartment may be substantially reduced as compared with arrangements in which the wiper motor is mounted rearwardly of said partition.

Conveniently there is a pair of wiper arm pivot shafts arranged so that the respective blades of the wiper arms will wipe the left-hand and right-hand portions of the vehicle windscreen; and the lever is conveniently mounted in a central position and has the portion thereof extending rearwardly of the partition connected to the respective driven cranks of the wiper arm pivot shafts by a pair of links.

The lever can be mounted for pivotal movement in either a substantially horizontal or a substantially vertical plane, and the pivotal connections between the links and the lever are preferably formed by ball and socket joints or like connections to permit movement of the links in two planes, as required by the movement of the cranks and the location of the lever and the wiper arm pivot shafts.

The scope of the invention is defined by the appended claims; and the invention and the method by which it is to be preformed are hereinafter particularly described with reference to the accompanying drawings in which:

FIGURE 1 is a plan of a first embodiment of a windscreen wiper drive mechanism according to the invention, and a part of the bodywork of a vehicle in which the system is installed;

FIGURE 2 is an elevation of the drive linkage and wiper pivot shafts as seen in the direction of the arrow A in FIGURE 1;

FIGURE 3 is an enlarged elevation of a detail in FIGURE 1;

FIGURE 4 is a plan similar to that of FIGURE 1 but showing a second embodiment of the drive mechanism according to the invention;

FIGURE 5 is an elevation of the drive linkage and wiper pivot shafts as seen in the direction of the arrow B in FIGURE 4;

FIGURE 6 is a plan similar to FIGURE 1 but showing a third embodiment of a drive mechanism according to the invention; and FIGURE 7 is an elevation of part of the drive linkage as viewed in the direction of the arrow C in FIGURE 6.

In the embodiment of the invention shown in FIGURES 1 to 3 an electric windscreen wiper motor 1 is mounted on a transverse support member 2 secured to the side walls 3 of the engine compartment 4 of a motor road vehicle near the front end thereof and a crank arm 5 driven by the motor is pivotally connected to one end of a link 6 the other end of which is pivotally connected to one arm 7 of a bell crank lever 8 which is mounted for pivotal movement in a substantially horizontal plane on a bracket 9 secured on the rear side of the partition 10 separating the engine compartment 4 from the passengers' compartment 11 of the vehicle. The bell crank lever 8 and the windscreen wiper motor 1 are arranged substantially centrally of the vehicle and the other arm 12 of the bell crank lever 8 has pivotally connected thereto one end of each of a pair of further links 14, 15 the other ends of which are respectively pivotally connected to the ends of a pair of driven cranks 16, 17 respectively fixed on one end of each of a pair of pivot shafts 18, 19 which extend within the passenger compartment 11 and have their other ends projecting externally of the vehicle scuttle 20 near the lower edge of the windscreen, said other ends of the pivot shafts being each adapted to have a windscreen wiper arm and blade secured thereon, for example by means of knurled portions 21, 22 on the outwardly extending ends. The shafts 18, 19 are journalled in bushes 23 secured in the partition 10.

The link 6 interconnecting the bell crank lever 8 and the motor drive crank 5 passes through an opening 24 in the partition 10 between the engine and passenger compartments 4, 11, the opening 24 preferably being closed by a grommet 25 of rubber or like material having a slit 26 therein to permit unobstructed movement of the link 6 whilst reducing to a minimum any opening through which noise could be transmitted from the engine compartment 4 to the passenger compartment 11.

Operation of the windscreen wiper motor 1 rotates the motor drive crank 5 to effect reciprocation of the link 6 connected thereto in a substantially horizontal plane and effect oscillatory movement of the bell crank lever 8 in a substantially horizontal plane about its pivot and reciprocation in a substantially vertical plane of the further links 14, 15 connected to the driven cranks 16, 17 of the wiper arm shafts 18, 19.

As the windscreen wiper drive motor 1 is mounted in the front portion of the engine compartment 4 the noise created by operation of the windscreen wiper motor 1 will be in a position remote from the passenger compartment 11 and separated therefrom by said partition 10, and the drive mechanism will therefore be substantially inaudible to the driver or passengers of the vehicle, or much less audible than is the case in which the drive motor lies within the passengers, compartment 11 or close to the partition 10 between the engine and passenger compartments 4, 11.

In the second embodiment of the invention shown in FIGURES 4 and 5 an electric windscreen wiper motor 31 is mounted to one side of the engine compartment 32 of a motor road vehicle and forwardly of the partition 33 separating the engine compartment 32 from the passenger compartment 34 of the vehicle. The motor 31 is conveniently secured on a bracket 35 fixed to the partition 33; or it may be secured to a side wall of the engine compartment 32. A crank arm 36 driven by the motor 31 is pivotally connected to one end of a link 37 which extends transversely of the engine compartment 32 and the other end of which is pivotally connected to one end of a lever 38 which extends longitudinally of the engine compartment 32 and is pivotally mounted for movement in a substantially horizontal plane on a bracket 39 fixed to the partition 33, said lever being pivotally mounted adjacent, or slightly rearwardly of the partition 33 and having said one end thereof extending through an opening 40 in the partition 33. The other end of the lever 38 is pivotally connected to one end of each of a pair of further links 41, 42 the other ends of which are respectively pivotally connected to the ends of a pair of driven cranks 43, 44 respectively fixed on one end of each of a pair of pivot shafts 45, 46 which extend within the passenger compartment 34, the other ends of the pivot shafts 45, 46 projecting externally of the vehicle scuttle 47 near the lower edge of the windscreen. A windscreen wiper arm blade is adapted to be secured on said other end of each pivot shaft, as by means of knurled portions 48, 49 on the ends of the pivot shafts 45, 46 respectively. The pivot shafts 45, 46 are journalled in bushes 50, 51 secured to the partition 33.

The opening 40 in the partition 33 through which one portion of the lever 38 extends is preferably closed in the manner shown in FIGURE 3 with reference to the first embodiment of the invention, by a grommet of rubber or like material having a transverse slit therein to permit unobstructed oscillatory movement of said end of the lever 38 whilst reducing to a minimum the size of opening in the partition 33 through which noise could be transmitted from the engine compartment 32 to the passenger compartment 34.

Operation of the windscreen wiper motor 31 rotates the motor drive crank 36 to effect reciprocation in a substantially horizontal plane of the link 37 connected thereto and effect oscillatory movement of the lever 38 in a substantially horizontal plane about its pivot and reciprocation in a substantially vertical plane of the further links 41, 42 connected to the driven cranks 43, 44 of the wiper arm shafts 45, 46.

In a third embodiment of the invention shown in FIGURES 6 and 7 the motor drive crank 60 of an electric motor 61 mounted on a bracket 62 secured to a side wall of the engine compartment 63 of a motor road vehicle is arranged for rotation in a vertical plane and is connected by a link 64 to a lever or crank 65 mounted on one end of a pivot shaft 66 which with the crank 65 thereon constitutes a lever which extends through the partition 67 between the engine compartment 63 and passenger compartment 68 of the vehicle; the pivot shaft 66 is journalled in a bush 69 secured in an opening in the partition 67, and the other end of the pivot shaft 66 has fixed thereon a further crank arm 70 to which are pivotally connected the ends of a pair of links 71, 72 the other ends of which are respectively pivotally connected to crank arms 73, 74 on the ends of pivot shafts 75, 76 which are adapted to carry windscreen wiper arms and are journalled in bushes 77, 78 secured in the partition 67.

Since, with each of the embodiments of the invention described above, the windscreen wiper drive motor is mounted in the engine compartment, forwardly of the partition between the latter and the passenger compartment, the noise created by the operation of the windscreen wiper motor will be in a location remote from the passenger compartment and separated therefrom by the partition, so that the drive mechanism will be substantially inaudible to the driver or passengers of the vehicle, or much less audible than is the case in which the drive motor lies within the passengers' compartment.

I claim:

1. In a motor vehicle having a front compartment and a passenger compartment separated by a partition and a windscreen adjacent said partition, a windscreen wiper drive mechanism comprising an electric windscreen wiper drive motor mounted forwardly and centrally of said front compartment, a drive crank mounted on said motor for rotation thereby, a wiper arm pivot shaft mounted adjacent said partition, an oscillatory driven crank secured on said pivot shaft rearwardly of said partition for movement in a substantially vertical plane, a bell crank lever member pivotally mounted rearwardly of said partition to transmit drive from said drive crank to said driven crank, a first reciprocable link member connecting one end of said bell crank lever member to said motor drive crank, and a second reciprocable link member connecting the other end of said bell crank lever member to said driven crank, said bell crank lever being mounted for pivotal movement in a substantially horizontal plane, said first reciprocable link member extending through an opening in said partition and through a transverse slit in a sheet of flexible material secured to said partition to overlie said opening.

2. In a motor vehicle having a front compartment and a passenger compartment separated by a partition and a windscreen adjacent said partition, a windscreen wiper drive mechanism comprising an electric windscreen wiper drive motor mounted forwardly of said partition and to one side of said front compartment, a drive crank mounted on said motor for rotation thereby, a wiper arm pivot shaft mounted adjacent said partition, an oscillatory driven crank secured on said pivot shaft rearwardly of said partition for movement in a substantially vertical plane, and a pivoted lever member mounted adjacent said partition to transmit drive from said drive crank to said driven crank, one end of said lever member extending forwardly of said partition through an opening therein, a first reciprocable link member connecting one end of said lever member to said motor drive crank, and the other end of said lever member extending rearwardly of said partition, and a second reciprocable link member connecting the other end of said lever member to said driven crank, said lever member being mounted for pivotal movement in a substantially horizontal plane.

(References on following page)

References Cited by the Examiner

UNITED STATES PATENTS

| | | |
|---|---|---|
| 1,800,578 | 4/1931 | Webb. |
| 2,006,320 | 6/1935 | Hueber _____ 15—250.27 X |
| 2,146,215 | 2/1939 | Horton _____ 15—250.3 |
| 2,196,083 | 4/1940 | Saurer _____ 74—566 X |
| 2,264,242 | 11/1941 | Horton _____ 74—43 X |
| 2,298,197 | 10/1942 | Coffey _____ 15—250.27 X |
| 2,305,505 | 12/1942 | Wagner _____ 74—18.1 |
| 2,760,221 | 8/1956 | Hitzelberger _____ 15—250.27 X |
| 3,091,792 | 6/1963 | Gute _____ 15—250.12 X |
| 3,113,334 | 12/1963 | Howard _____ 15—250.27 |

FOREIGN PATENTS

| | | |
|---|---|---|
| Add. 59,859 | 2/1954 | France. |
| 841,385 | 2/1939 | France. |
| 871,700 | 3/1953 | Germany. |

MILTON KAUFMAN, *Primary Examiner.*

BROUGHTON G. DURHAM, *Examiner.*

D. H. THIEL, *Assistant Examiner.*